Patented May 13, 1941

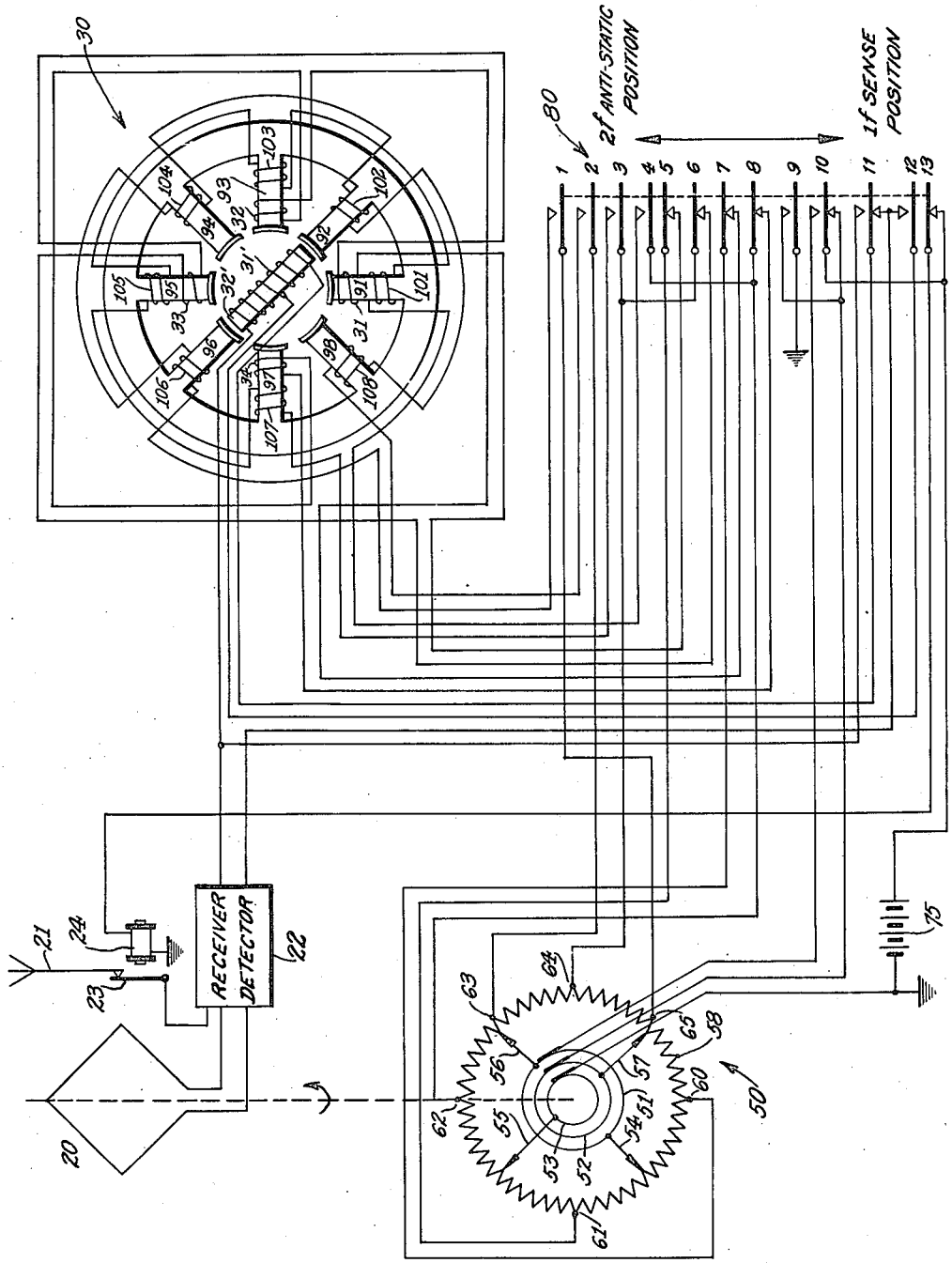

2,241,883

UNITED STATES PATENT OFFICE 2,241,883

DIRECTION FINDER ARRANGEMENT

Norman E. Klein, Chicago, Ill., assignor, by mesne assignments, to International Telephone Development Co. Inc., New York, N. Y., a corporation of Delaware Application January 6, 1940, Serial No. 312,665

6 Claims. (Cl. 250—11)

My invention relates to radio direction finders, and more particularly to radio direction finders utilizing a continuously rotatable loop and provided with means for giving a direct indication of the direction to be determined.

In these types of direction finders the direction of propagation of received waves may be readily determined by comparing the intensity of reception for all directions with a separately generated wave having a frequency comparable with the increase and decrease of energy produced by rotation of said receiving antenna. The currents derived from the signal by means of the rotary loop are compared in a phase meter with the magnetic field set up by a polyphase generator so that the pointer will assume a position indicating the line of direction.

It is a principal object of my invention to provide a direction indicator wherein a simple switching arrangement is provided for obtaining the bearing direction and the sense indication.

This desired result may be obtained in accordance with a feature of my invention by utilizing a continuously rotatable loop together with a generator comprising a resistor unit and rotatably mounted brush. For the direction signals without sense indication the switching means forms connections to produce a frequency output from the generator equal to twice that of rotation of the loop since the pattern of a loop has two maxima and minima. When a sense indication is to be obtained the field pattern picked up by the loop is uni-directional and therefore a frequency is generated equal to the speed of rotation of the loop.

According to my invention I provide a simple switching arrangement for altering connections of the generator to produce either of these desired frequency outputs, and provide in co-operation with this unit a meter which will indicate the direction line or the sense of direction dependent upon the position of the switch.

Other features and objects of my invention will be readily understood from the description of my invention made with reference to the accompanying drawing, the single figure of which illustrates diagrammatically a circuit arrangement of a direction finder in accordance with my invention.

According to my invention I provide a loop antenna 20 and a vertical sensing antenna 21 the outputs of which are fed to a receiver detector arrangement 22, and from there to the central movable winding 31' of an indicating phase meter device 30. Synchronously driven with rotatable loop 20, I provide a generator indicated generally at 50, the output of which is applied to phase meter indicator 30, for reaction with the output from the receiver 22, so as to indicate direction. Cooperating with generator 50 and interconnecting this generator with phase meter 30, I provide a two position switch indicated generally at 80. In the lower position (which is illustrated in the drawing) the generator 50 is connected so as to generate a frequency equal to a single wavelength for each rotation of the loop, for determining the sense position of the station, the direction of which is to be located. In the upper position the generator 50 is connected to generate a frequency twice that produced by the speed of rotation, for the purpose of indicating the line of direction in cooperation with the output of receiver 22.

Phase meter 30 in the sensing position of switch 80 is connected to provide only four magnetic poles, and in the antistatic direction line position so as to have eight poles. By this arrangement a single scale is all that is required for reading the direction, regardless of whether the loop antenna alone, or in combination with the vertical sensing antenna 21 is connected into the circuit with the loop to indicate, respectively, the direction line only or the line of position of the station. A more detailed description of the circuit in the present drawing will now be given to facilitate complete understanding of my invention.

As stated above the output from the receiver 22 is coupled to the movable coil 31' of phase meter 30. The circuit for the coil may be traced as follows: From the receiver-detector 22 through the winding 31', contact tongue 11 and lower associated contacts of switch 80 back to receiver-detector 22. Accordingly, coil 31' will be energized with an alternating potential producing one cycle for each single rotation of loop 20.

Synchronously driven with loop 20 is the generator slip ring arrangement and contact assembly comprising slip rings and contact brushes 51, 52, 53 and 54, 55, 56, 57, respectively. Brushes 54 to 57 rotate around a continuous resistor unit 58, points of which are connected as shown at 60, 61, 62, 63, 64 and 65 to suitable associated windings in phase meter 30. A potential is applied from battery 75 across diametrically opposite points of resistance potentiometer unit 58 in a circuit as follows: Battery 75, contact tongue 10, lower contact switch 80, slip ring 52, brush arm 57, in opposite directions through resistor 58, brush arm 55, slip ring 53 to the grounded terminal of battery 75. Since brush arms 55, 57 are continuously rotated a variable potential will be set up in the resistance unit 58 among the various points 60 to 65, inclusive.

With the switch in the sense position as shown only terminals 60, 61, 62 and 64 are effective, the other terminals 63 and 65 being open at contacts 1 and 2 of switch 80. From 61 a circuit may be traced over contact 5 of switch 80, field windings 31 and 33 of phase meter 30, in series, contact 6 of switch 80 to point 64 on resistance unit 58. Phase meter 30 is provided with eight poles as shown, 91 to 98, inclusive. However, in the sensing position only four of these poles are used. Accordingly, it can be seen that poles of opposite polarity will be created in poles 91, 95 by the current through windings 31, 33. The field in the windings will vary cyclically with rotation of brushes 55, 57, consequently creating a field variation synchronous in frequency with that produced in the output of receiver 22 by the rotation of antenna 20, and its associated station antenna 21.

Similar energizing fields for pole pieces 93, 97, may be traced from point 62 on resistance 58, contacts 8 of switch 80, winding 34 on pole piece 97, winding 32 on pole piece 93, contacts 7 of switch 80, to point 60 on resistance 58. Accordingly, another field varying synchronously with the field from loop 20 is provided in phase quadrature to the first field, so that in effect a rotating magnetic field is produced in meter 30 from the generator 50. Since in only one position is a maximum obtained in the output of receiver-detector 22 by the combined field from antenna 21 and loop 20, vane 32' carrying winding 31' can come to rest only in one position depending on the phase relation of the detected output and the rotating field. Accordingly, a direct indication of the direction of the station may be obtained.

Since it is generally desirable to provide for direction finding a rotatable loop only and not the sensing antenna 21 so that the static picked up by the non-directional signal will not interfere with signals, I provide further a switching means 23 for disconnecting antenna 21 when the direction line only is desired. For the convenience of controlling switch 23 from a remote point and from the single switch, I provide a relay 24 energized in a circuit extending from battery 75, contacts 13 of switch 80 in the sense position, winding of relay 24 to ground.

When the direction line only without the sensing arrangement is desired, switch 80 is moved to the upper position. This opens the circuit for relay 24 at contacts 13 of switch 80, releasing contacts 23 and disconnecting antenna 21 from the receiver. At the same time windings 31, 32, 33 and 34 on meter 30 are opened at contacts 5, 6, 7 and 8 of switch 80, and points 60, 61, of generator 50 are disconnected from the circuit at switch contacts 5 and 7.

The connections from the output of receiver-detector 22 are also changed so that the ends of coil 31' are connected together over upper contacts 11 of switch 80 to one side of the output circuit, the other side of the output circuit being applied to the mid-point of coil 31', over a circuit extending from the detector-receiver over contacts 12 of switch 80 to the mid-point of coil 31'. Consequently poles of like nature are created in either end of rotatable vane 32', so that the vane will have similar poles at each end and opposite poles at the center thereof. The pole pieces 91 to 98, inclusive, are each provided with windings 101 to 108, inclusive, the windings 101, 103, 105 and 107, being connected in series and connected to points 62, 64, displaced 90° from one another on resistance 58 through contacts 4 and 3, respectively. The windings 102, 104, 106 and 108, are connected together in series, and points 63, 65, on resistance 58 displaced 90° with respect to one another, and 45° with respect to points 62, 64, over contacts 2 and 1, respectively, of switch 80. At the same time slip ring 51 is connected over contact 10 and upper contact of switch 80 to the positive pole battery 75, and slip ring 52 is connected to ground over contact 9 of switch 80, so that positive potential is applied at two points on resistor 58 diametrically spaced one from another by brushes 54, 56, and two other diametrically spaced points connected through brushes 55 and 57, are connected to ground potential. As a consequence upon rotation of the brushes with loop 20, potential variations at twice the frequency of rotation of loop 20 occur, so that the pole pieces 91 to 98, inclusive, are energized at a frequency equal to twice the frequency of rotation of the loop.

Similarly, under these conditions the loop is bidirectional, the frequency output from receiver-detector 22 is equal to twice the frequency of the loop rotation. Accordingly, winding 31' will be energized twice during each cycle of revolution of the loop and the rotating field created in the indicating meter 30 will be such that the vane 32' can line up only in one direction line, however, with a 180° ambiguity. Accordingly, in this arrangement the direction line of the transmitting station may be readily obtained, although the direction sense is not obtainable. Since the loop antenna is free from static to a greater degree than a vertical antenna, a much more accurate reading of direction may be obtained by this system. However, when it is desired to obtain the sense of direction it is only necessary to move the single switch 80 from one position to the other.

While I have illustrated the common control by way of relay 24, for operating the switch 23 for connecting in sensing antenna 21, it should be readily understood that if desired a mechanical interconnection instead of the relay circuit may be utilized. Furthermore, no interconnection need be provided if both switches are readily available to the operator, since the operator may manually operate switch 23 and switch 80 to the desired position for proper cooperation. However, in the preferred arrangement interconnection of these switches is desirable.

While I have described certain features of my invention in connection with the preferred embodiment illustrated in the drawing, it should be distinctly understood that this is merely by way of illustration of a preferred embodiment thereof. What I consider my invention and desire to obtain protection upon, is embodied in the accompanying claims.

What I claim is:

1. A direct reading radio direction finder comprising a continuously rotatable loop antenna, a sensing antenna, a receiver, a phase indicating means, means for feeding the output of said receiver to a coil pivotally mounted in a rotating electro-magnetic field in said phase indicating device, a polyphase generator comprising a circular potentiometer resistance unit, and a plurality of brushes rotatable synchronously with said loop for applying direct current potential differences to said resistor, means interconnecting certain points on said resistor and said phase indicating device to produce said rotatable electro-magnetic field and a two-position switch means interposed between said generator and said indicator device for producing in said phase indicating means in one position a rotating field having the same frequency as produced by a single rotation of the loop and in the other position a rotatable field rotating at twice the frequency of rotation of said loop.

2. A direct reading direction finder in accordance with claim 1, further comprising means controlled by said switch in one position to connect said sensing antenna to said receiver-detector and in the other position to disconnect said sensing antenna therefrom.

3. A direct reading radio direction finder comprising a rotatable loop antenna, a receiver for receiving and detecting signals impressed upon said antenna, a rotatably mounted coil coupled to the output of said receiver, a sensing antenna arranged for connection and disconnection from said receiver, a generator comprising a circular resistance element, means rotatable synchronously with said loop for applying direct current potentials to said resistance element, means connected to spaced points on said resistance element for supplying alternating current fields upon rotation of said synchronously rotatable means, a phase indicator for indicating the direction of a received field comprising a rotatable vane upon which is mounted said coil coupled to the output of said receiver, a plurality of pole pieces arranged in a circle about said movable vanes, two sets of windings on said pole pieces and switching means operable in one position to apply direct current potentials to diametrically opposite points of said resistance element, and to connect diametrically opposite points of said resistance element to one set of windings on said pole pieces, and in the other position to impress direct current potentials across points displaced 90° along said resistance element and to impress alternating potentials on the other set of windings on said pole pieces from points spaced 90° apart on said resistance element whereby in one position a rotatable field substantially synchronous with the rotation of said loop is created and in the other position a rotatable field twice the frequency of rotation of said loop is created, whereby said system may indicate only the direction and sense, or merely the line of direction.

4. A direct reading receiver according to claim 3, further comprising switch controlled means operative by movement of said switch in the first position for connecting said sensing antenna to said receiver, and in the other position for disconnecting said antenna from said receiver-detector.

5. A direct reading direction finder according to claim 3, further comprising means operative upon movement of said switch to the first position for connecting said coil across the output of said receiver and in the second position of said switch for connecting the ends of said coil to one side of said output and the mid-point of said coil to the other side thereof.

6. A direct reading receiver according to claim 3, further comprising switch controlled means operative by movement of said switch in the first position for connecting said sensing antenna to said receiver, and in the other position for disconnecting said antenna from said receiver, means operative upon movement of said switch to said first position for connecting said coil across the output of said receiver and in the second position of said switch for connecting the ends of said coil to one side of said output and the mid-point of said coil to the other side thereof.

NORMAN E. KLEIN.